(12) United States Patent
Kämper

(10) Patent No.: US 9,452,690 B2
(45) Date of Patent: Sep. 27, 2016

(54) DIVIDED VEHICLE SEAT BACKREST AND MANUFACTURING METHOD

(71) Applicant: Faurecia Autositze GmbH, Stadthagen (DE)

(72) Inventor: Ralf Kämper, Wedemark (DE)

(73) Assignee: Faurecia Autositze GmbH, Stadthagen (DE)

( * ) Notice: Subject to any disclaimer, the term of this patent is extended or adjusted under 35 U.S.C. 154(b) by 88 days.

(21) Appl. No.: 13/948,297

(22) Filed: Jul. 23, 2013

(65) Prior Publication Data

US 2014/0159449 A1    Jun. 12, 2014

(30) Foreign Application Priority Data

Jul. 23, 2012 (DE) .................. 10 2012 014 497

(51) Int. Cl.
| | |
|---|---|
| *B60N 2/02* | (2006.01) |
| *B60N 2/01* | (2006.01) |
| *B60N 2/36* | (2006.01) |
| *B60N 2/22* | (2006.01) |
| *B60N 2/68* | (2006.01) |

(52) U.S. Cl.
CPC . *B60N 2/01* (2013.01); *B60N 2/22* (2013.01); *B60N 2/36* (2013.01); *B60N 2002/684* (2013.01); *B60N 2205/35* (2013.01); *Y10T 29/49947* (2015.01)

(58) Field of Classification Search
None
See application file for complete search history.

(56) References Cited

U.S. PATENT DOCUMENTS

| | | | | | |
|---|---|---|---|---|---|
| 4,368,557 | A | * | 1/1983 | Inasawa et al. ................. | 16/263 |
| 4,620,344 | A | * | 11/1986 | Lewis, Jr. ........................ | 16/337 |
| 4,708,385 | A | * | 11/1987 | Kondo ........................ | 296/65.17 |
| 4,883,319 | A | * | 11/1989 | Scott ............................ | 297/354.1 |
| 4,958,877 | A | * | 9/1990 | Lezotte et al. .............. | 296/65.17 |
| 5,263,763 | A | * | 11/1993 | Billette ....................... | 296/65.17 |
| 5,273,336 | A | * | 12/1993 | Schubring et al. ........ | 296/65.17 |

(Continued)

FOREIGN PATENT DOCUMENTS

| | | |
|---|---|---|
| DE | 296 20 145 U1 | 2/1997 |
| DE | 197 40 776 C1 | 10/1998 |

(Continued)

OTHER PUBLICATIONS

German Office Action of DE 10 2012 014 497.0, filed Jul. 23, 2012, dated Feb. 20, 2013 (5 pages).

(Continued)

*Primary Examiner* — David E Allred
(74) *Attorney, Agent, or Firm* — Shlesinger, Arkwright & Garvey LLP

(57) ABSTRACT

Divided vehicle seat backrest includes at least a first backrest part and a second backrest part that are rotatably supported on a center bracket via an inner bearing pin. The inner bearing pin may be accommodated in a recess in the second backrest part. The inner bearing pin may be fastened to the first backrest part, and a positive fit is formed between the inner bearing pin and the second backrest part. The supporting of the bearing pin on the center bracket and the supporting of the second backrest part on the bearing may pin preferably occur without supplementary parts or securing elements. For installation, the bearing pin may be initially placed through the center bracket, and the second backrest part may thus be subsequently mounted by placement, insertion, and pivoting on the inner bearing pin.

12 Claims, 5 Drawing Sheets

(56) References Cited

U.S. PATENT DOCUMENTS

| | | | |
|---|---|---|---|
| 5,340,195 A * | 8/1994 | Notta | 297/354.1 |
| 5,577,295 A * | 11/1996 | Papke et al. | 16/254 |
| 5,700,058 A * | 12/1997 | Balagurumurthy et al. | 297/440.15 |
| 5,833,203 A * | 11/1998 | Denis | B60N 2/01525 248/220.22 |
| 6,012,776 A | 1/2000 | Schneider et al. | |
| 6,174,030 B1 * | 1/2001 | Matsuo | 297/463.1 |
| 6,701,572 B2 * | 3/2004 | Bechthold | 16/235 |
| 7,073,861 B2 * | 7/2006 | Ichikawa et al. | 297/378.1 |
| 7,083,215 B2 * | 8/2006 | Rhee et al. | 296/65.16 |
| 7,172,253 B2 | 2/2007 | Haverkamp | |
| 7,172,255 B2 | 2/2007 | Wanke | |
| 7,273,243 B2 | 9/2007 | Prugarewicz | |
| 7,278,689 B2 | 10/2007 | Guillouet | |
| 7,278,690 B2 | 10/2007 | Bej | |
| 7,390,059 B2 | 6/2008 | Brockschnieder et al. | |
| 7,390,063 B2 | 6/2008 | Behrens | |
| 7,410,219 B2 | 8/2008 | Kraft et al. | |
| 7,416,254 B2 | 8/2008 | Jennings | |
| 7,425,038 B2 | 9/2008 | Deptolla | |
| 7,461,900 B2 | 12/2008 | Lange | |
| 7,479,749 B2 | 1/2009 | Gerding et al. | |
| 7,490,900 B2 | 2/2009 | Szczudrawa | |
| 7,506,939 B2 | 3/2009 | Brockschnieder et al. | |
| 7,517,022 B2 | 4/2009 | Habedank et al. | |
| 7,581,793 B2 * | 9/2009 | Hartmann et al. | 297/463.1 |
| 7,673,944 B2 | 3/2010 | Behrens | |
| 7,746,011 B2 | 6/2010 | Gerding et al. | |
| 8,020,256 B2 * | 9/2011 | Goller et al. | 16/342 |
| 8,595,901 B1 * | 12/2013 | Shaw et al. | 16/235 |
| 8,820,814 B2 * | 9/2014 | Asai et al. | 296/63 |
| 8,950,782 B2 | 2/2015 | Dobruia et al. | |
| 9,016,787 B2 | 4/2015 | Romer | |
| 9,016,789 B2 | 4/2015 | Romer et al. | |
| 9,266,449 B2 | 2/2016 | Behrens | |
| 2004/0075404 A1 | 4/2004 | Gerding et al. | |
| 2006/0055224 A1 | 3/2006 | Wanke | |
| 2006/0061184 A1 | 3/2006 | Jennings | |
| 2006/0108491 A1 | 5/2006 | Behrens | |
| 2006/0119158 A1 | 6/2006 | Haverkamp | |
| 2006/0138842 A1 | 6/2006 | Behrens | |
| 2006/0163932 A1 | 7/2006 | Bej | |
| 2006/0175887 A1 | 8/2006 | Behrens | |
| 2006/0214485 A1 | 9/2006 | Brockschnieder et al. | |
| 2006/0237986 A1 | 10/2006 | Brockschnieder et al. | |
| 2006/0261661 A1 | 11/2006 | Kraft et al. | |
| 2006/0290188 A1 | 12/2006 | Guillouet | |
| 2007/0013212 A1 | 1/2007 | Meister | |
| 2007/0063565 A1 | 3/2007 | Habedank et al. | |
| 2007/0069561 A1 | 3/2007 | Schnabel et al. | |
| 2007/0096668 A1 | 5/2007 | Gerding et al. | |
| 2007/0108824 A1 | 5/2007 | Lange | |
| 2007/0126272 A1 | 6/2007 | Deptolla | |
| 2007/0222263 A1 | 9/2007 | Szczudrawa | |
| 2008/0284224 A1 * | 11/2008 | Hartmann | B60N 2/3013 297/378.14 |
| 2011/0187168 A1 * | 8/2011 | Zorine | 297/248 |
| 2013/0341951 A1 * | 12/2013 | Asai | B60N 2/015 296/63 |

FOREIGN PATENT DOCUMENTS

| | | |
|---|---|---|
| DE | 299 23 174 U1 | 6/2000 |
| DE | 101 33 708 C1 | 12/2002 |

OTHER PUBLICATIONS

Second German Office Action of DE 10 2012 014 497.0, filed Jul. 23, 2012, dated Jul. 21, 2014 (3 pages).

* cited by examiner

DIVIDED VEHICLE SEAT BACKREST AND MANUFACTURING METHOD

CROSS-REFERENCE TO RELATED APPLICATIONS

This application claims the priority of German patent application no. 10 2012 014 497.0, filed Jul. 23, 2012, and which is incorporated herein by reference.

FIELD OF THE INVENTION

The invention relates to a divided vehicle seat backrest, in particular for a motor vehicle, and a method for manufacturing and for installing this type of vehicle seat backrest or a vehicle seat having this type of vehicle seat backrest.

BACKGROUND OF THE INVENTION

The vehicle seat backrest may in particular be a rear backrest or a backrest of a backward-facing seat, which in particular is fastened directly to the vehicle structure. The divided vehicle seat backrest has a first and a second backrest part which are foldable independently from one another. The division may in particular be uneven, for example 60-40, or also even. In their upper region or area the backrest parts are preferably also laterally lockable together on the outside and on the inside, for example.

The backrest parts are each rotatably and/or pivotably supported on the left and right, for example, in bearing pins; thus, the left backrest part is mounted on its left side in an outer bracket, and correspondingly the right backrest part is mounted on its right side in an outer bracket. Toward the middle, the two backrest parts are rotatably mounted on a center bracket (middle receptacle).

A high degree of collision safety must be ensured in the connection of the backrest parts to the center bracket; in a typical collision the backrest parts may in particular be pulled outwardly, or pivoted outwardly and upwardly at their inner bearing points. Therefore, securing elements and additional components for a hold that is secure in the event of a collision are generally provided.

It is known from DE 299 23 174 U1 to use a shared bearing pin for supporting both backrest parts on the center bracket. The bearing pin is placed in the axial direction through a first backrest part, the center bracket, and a second backrest part. In addition, a securing element is placed between the center bracket and one backrest part, the securing element having a recess which has a broader and a narrower region or area and which may be adjusted perpendicular to the pivot axis in order to enclose the bearing pin with the narrower area for securing. The center bracket is formed by two bearing blocks, between which the securing element is inserted. In addition, an intermediate sleeve which is used as a spacer and a positive fit means is placed between a bearing block and a backrest part. A tapered securing region or area having a securing shoulder which represents the end is formed at the end of the bearing pin, and is intended to prevent the bearing bore of the one backrest part from slipping from the bearing journal, even under extreme load; however, these areas are not relevant for normal operation.

DE 296 20 145 U1 discloses a divided motor vehicle rear seat backrest having a more complex connection of the backrest parts to the center bracket; the connection to the outer bracket is established by outwardly protruding bearing pins having spring tongues which are radially outwardly spreadable to prevent them from being pulled out.

Thus, these types of vehicle seats generally have a complex design with a plurality of supplementary parts and securing means, and require complicated manufacture with many assembly steps.

OBJECTS AND SUMMARY OF THE INVENTION

An object of the invention is to provide a divided vehicle seat backrest which allows secure yet relatively simple installation. A further aim is to provide a corresponding installation method and manufacturing method.

This object is achieved by a divided vehicle seat backrest according to the invention.

This object is likewise achieved by a divided vehicle backrest according to the invention which includes a first backrest part and a second backrest part which are rotatably supported on a center bracket via an inner bearing pin, the inner bearing pin being accommodated in a recess in the second backrest part, and the inner bearing pin is fastened to the first backrest part, and a positive fit is formed between the inner bearing pin and the second backrest part.

This object is likewise achieved by a method for installing or manufacturing a divided vehicle seat backrest, in particular a vehicle seat backrest according to the invention, having at least the following steps:
  a) producing or providing a first backrest part and an inner bearing pin which is accommodated in or fastened to the first backrest part, a center bracket, and a second backrest part having a mounting part,
  b) inserting or passing the inner bearing pin through a receptacle of the center bracket,
  c) placing the mounting part on a pin head of the inner bearing pin at an inclined or diagonal angle,
  d) pushing the mounting part onto the bearing pin in such a way that the pin head of the inner bearing pin passes through an insertion area or region of a recess in the mounting part,
  e) pivoting the second backrest part relative to the mounting part in such a way that a neck area or region of the inner bearing pin passes from the insertion area or region into a positive-fit area or region having a smaller diameter, the positive-fit area or region being held by the pin head in the axial direction in a positive-fit manner, and
  f) fastening the second backrest part to an outer bracket.

The invention is based on the concept of fastening the inner bearing pin to one of the backrest parts, referred to as the first backrest part, and to accommodate and rotatably support the other, second backrest part on the bearing pin in a positive-fit manner. This accommodation should advantageously occur without auxiliary elements or additional securing elements.

According to the manufacturing method according to the invention, the second backrest part is accommodated and supported by a pivot motion, among other motions, on the bearing pin which is already accommodated in the center bracket.

The configuration according to the invention thus differs markedly from previous systems, in which initially the backrest parts are attached, and the pivotable bearing and securing occurs by inserting the backrest pin through the backrest parts and the center bracket.

This is based on the finding according to the invention that this type of installation of the second backrest part on the bearing pin in principle is initially more complicated, since the second backrest part must be appropriately handled instead of placing the bearing pin, with a simple axial motion, through bearing eyes or bearing receptacles of the backrest parts and the center bracket. However, a reduction in the number of method steps is made possible according to the invention, together with further advantageous characteristics concerning the stability of the hold and collision safety.

In addition, according to the invention the number of components is greatly reduced; in particular, additional elements or auxiliary elements for the connection between the bearing pin and the backrest parts may be largely or even completely dispensed with.

To this end, a recess is preferably provided on the second backrest part, for example a mounting part of the second backrest part, which has a wider insertion region or area for an enlarged pin head of the bearing pin, whereby a narrower positive-fit region or area for the bearing accommodation of a neck area of the bearing pin directly or indirectly adjoins the insertion area.

The bearing pin may be fixedly accommodated on the first backrest part, for example by inserting through a recess in the first backrest part and welding to the first backrest part; this may be carried out, for example, on a mounting plate of the first backrest part. The first backrest part together with the bearing pin thus forms an assembly which may be subsequently placed through a bearing receptacle of the center bracket. The bearing pin thus subsequently protrudes in the axial direction, whereupon the second backrest part is inserted into the already mounted bearing pin by pivoting.

The second backrest part advantageously has two bearing regions or areas, a first bearing pin receptacle for supporting a middle cylindrical bearing region or area of the bearing pin having a wider diameter, and a second bearing pin receptacle which accommodates a neck region or area of the bearing pin which is axially outwardly adjoined by the pin head. A positive fit may thus be formed without further auxiliary means, in that the pin head engages behind the second bearing pin receptacle in a positive-fit or form-locking or positive locking manner.

For installation, the backrest part is initially attached at an angle, i.e., diagonally, with its first bearing receptacle on the pin head of the bearing pin. "At an angle or diagonally," i.e., an inclined angle, is understood to mean a positioning in which the axis of symmetry of the mounting area of the second backrest part, which subsequently coincides with the bearing axis of the bearing pin, initially is not parallel or aligned in the same direction, but, rather, makes contact at an angle of between 0° and 90° with respect to same. The entire second backrest part together with its mounting part, which in particular may be a mounting plate welded to structural parts of the second backrest part, is thus placed on the pin head at an inclined angle, and is subsequently accommodated on the bearing pin in an insertion motion or a threading motion.

This threading motion may in particular be a linear motion initially, in which the bearing pin is successively guided with its pin head through the two bearing pin receptacles of the mounting part.

The second backrest part is subsequently pivoted or tilted until the axis of symmetry of its mounting region or area lies in the bearing axis.

Installation is thus possible in a few steps, namely, placement at an angle, a (linear) insertion motion, and subsequent pivoting, without additional locks, fixing elements, etc., and basically without additional auxiliary elements or devices which are to be introduced.

The second backrest part preferably has two axially offset bearing pin receptacles for the bearing pin, thus increasing the strength.

Since the positive fit is achieved directly between the backrest part and the bearing pin without additional securing elements, failure of the additional securing elements may be ruled out; a high degree of collision safety is achieved with low manufacturing costs and a small number of parts.

The seat for mounting is thus pivoted downwardly at its outer end as a result of the insertion region or area of the recess in the mounting part being situated beneath the positive-fit region or area or bearing area of the recess. At the top, the neck area of the bearing pin rests against the mounting part of the second backrest part. Thus, in particular a high degree of collision safety is also achieved in typical collision situations in which breaking away of the backrest parts from the center bracket is a threat; in the configuration according to the invention, such a motion generally results in the bearing pin being pushed upwardly, although it does not come out of the recess in the mounting part.

Assembly and disassembly may be carried out without additional tools, it being necessary only to appropriately tilt and displace the backrest part.

The center bracket may be implemented by a single component, which in particular is designed as a sheet metal part having a top attachment part for mounting to the vehicle structure and the bearing receptacle or recess.

Relative terms such as up, down, left and right are for convenience only and are not intended to be limiting.

The invention is explained in greater detail below with reference to the appended drawings of one embodiment, which show the following:

DETAILED DESCRIPTION OF THE INVENTION

Figure 1:
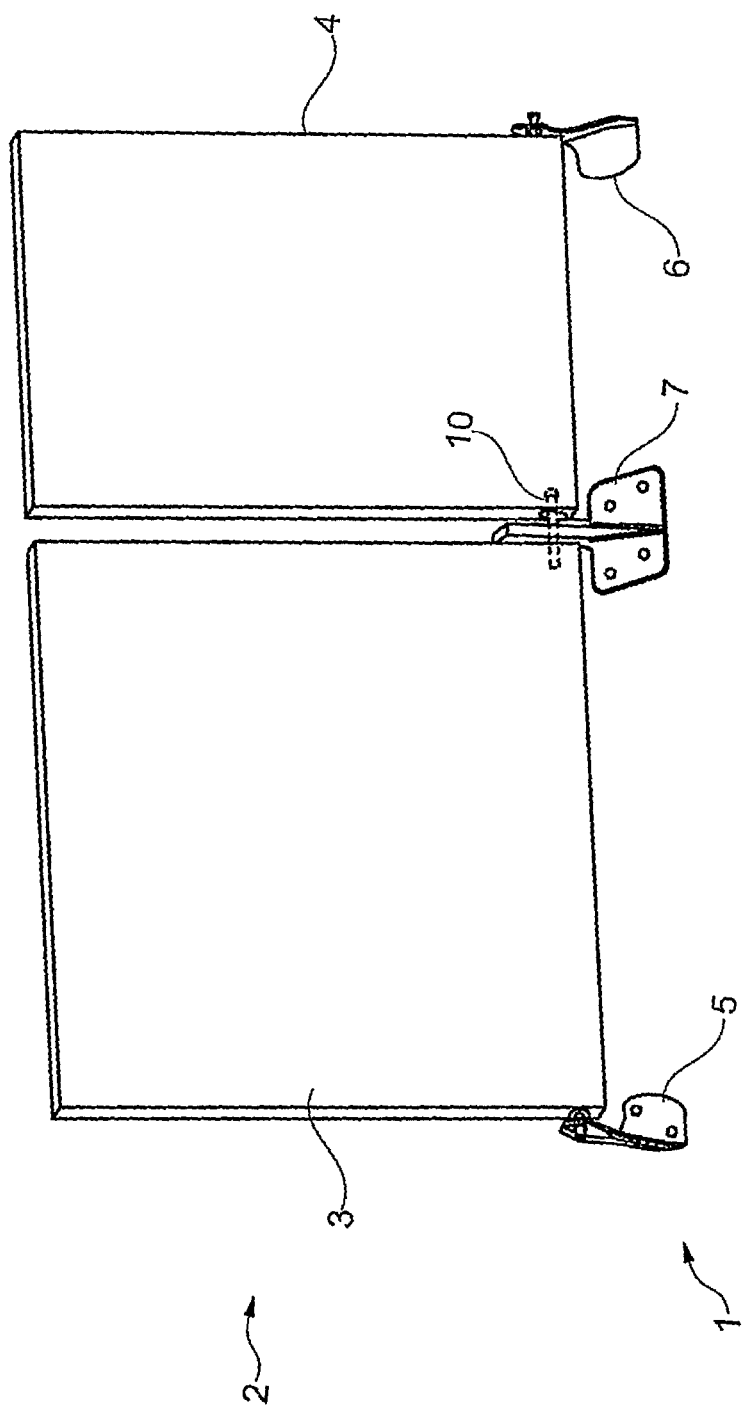
FIG. 1 shows a slightly perspective front view of a divided vehicle backrest according to one embodiment of the invention, in a schematic illustration.
Figure 2:
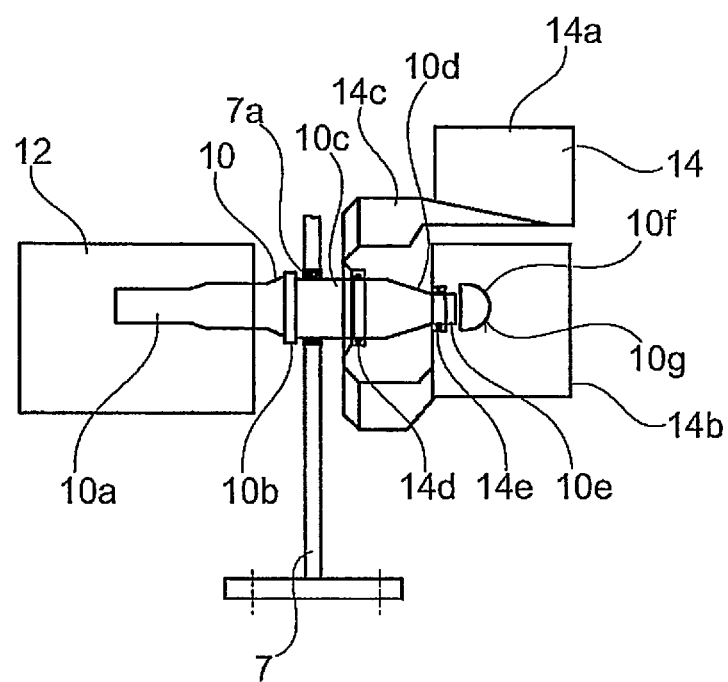
FIG. 2 shows a sectional view of the region or area for connecting the backrest parts to the center bracket according to the invention.

The drawings essentially show a divided vehicle seat backrest 2 according to the invention, which in particular may be a back seat backrest, of a vehicle seat 1. According to the highly schematic illustration in FIG. 1, the vehicle seat backrest 2 has a larger first backrest part 3 and a smaller second backrest part 4, in a 60-40 division as shown in the present case, in addition to outer brackets 5, 6 and a center bracket 7; the brackets 5, 6, 7 may in particular be fastened to the vehicle chassis or also to a seat part of the vehicle seat 1. The backrest parts 3, 4 are pivotable and/or are foldable independently from one another, and in particular may be locked together, in a manner not shown here, in their upper region or area. The backrest parts are pivotably mounted on the outer brackets 5, 6 in corresponding outer bearing pins, and pivotably mounted on the center bracket 7 via an inner bearing pin 10.

The inner bearing pin 10 is fixedly fastened to the left backrest part 3, and may, for example, be welded to a mounting plate 12 of the first backrest part 3. The inner bearing pin may additionally be accommodated in a positive-fit manner on the first backrest part, for example inserted through a recess in the mounting plate 12 and welded along its periphery. The bearing pin 10 thus has a fastening region or area 10*a* for fastening to the first backrest part 3, in particular the mounting plate 12, and also has a ring-shaped stop 10*b*, a cylindrical bearing region or area 10*c* adjoining the ring-shaped stop 10*b* on the right, a taper 10*d*, adjoining the cylindrical bearing area 10*c*, which in the present case has a configuration which conically tapers outwardly (to the right), a neck area 10*e*, adjoining the cylindrical bearing area, which is used as a second bearing area for supporting the second backrest part 4 or a mounting plate 14 of the second backrest part 4, and a pin head 10*f*, adjoining the neck area 10*e*, which is configured as an expansion and which has a surface 10*g* that is rounded outwardly (to the right).

The first bearing area 10*c* is used for supporting the inner bearing pin 10 and the first backrest part 3, fixedly connected thereto, in a bearing recess 7*a* in the center bracket 7. The second mounting plate (second inner pivot bracket) 14 of the second backrest part 4 has contact surfaces 14*a*, 14*b* for fastening to the second backrest part 4, in addition to a bent bearing area 14*c*, extending between the contact surfaces 14*a*, 14*b*, in which a first bearing pin receptacle 14*d* is provided for accommodating the cylindrical bearing area 10*c* of the inner bearing pin 10, and a second bearing pin receptacle 14*e* for accommodating the neck area 10*e* of the bearing pin 10. The two bearing pin receptacles 14*d* and 14*e* are each configured as holes or recesses having protuberances of the sheet metal material; the first bearing pin receptacle 14*d* is also used for the initial insertion of the bearing pin 10, and therefore has an open protuberance of the sheet metal material pointing to the right. The second bearing pin receptacle 14*e* has a slightly more complex design, with a recess 14*f*, apparent in FIG. 3, for example, which widens downwardly, thus forming a wider insertion area 14*f*1 and a smaller positive-fit area 14*f*2 at the top which adjoins the insertion area 14*f*1. In other words, the second bearing pin receptacle 14*e* and its recesses 14*f* form a noncircular or lobed hole, with the recess 14*f* forming or being the wider insertion area as shown and described.

First backrest part 3 and second backrest part 4 generally defining a plane and for supporting forces that are applied perpendicular to the plane by a seat occupant under normal sitting conditions. The first and second backrest parts 3,4 are rotatably supported on center bracket 7 via inner bearing pin 10. The inner bearing pin 10 is accommodated in bearing recess 7*a* in the center bracket and in a recess in the second backrest part; and each of the first and second bearing pin receptacles 14*d*, 14*e* are holes. The second bearing pin receptacle 14*e* including the recess in the second backrest part 4, the second bearing pin receptacle 14*e* and the recess in the second backrest part 4 form a lobed receptacle with the recess 14*f* being an insertion area 14*f*1 that is wider than the second bearing pin receptacle 14*e* and is located in a direction parallel to the plane defined by the second backrest part 4. This is readily apparent as shown in FIGS. 1-4 and described herein.

The positive-fit area 14*f*2 has a smaller diameter than the pin head 10*f*, and is used for accommodating the thinner second bearing area 10*e*; a protuberance or a contact edge 14*g* which is used for contacting the second bearing area 10*e* is correspondingly provided at the upper edge of the positive-fit area 14*f*2.

Thus, a single mounting plate 14 (or mounting clamp) may be used as a bent sheet metal part for accommodating the more complexly shaped bearing pin 10 on the second backrest part 4. The mounting plate 14 may be configured as a sheet metal part that is bent or folded at the edges, and is welded, for example, to structural parts 22, 23 of the second backrest part 4.

Installation is carried out by a pivoting and snapping-in motion. The components are initially provided or produced in a step St0, the inner bearing pin 10 being fixedly fastened to the first backrest part 3. The mounting plate 14, as a sheet metal plate that is bent or folded on bending lines, is or becomes fixedly mounted to the structure of the second backrest part 4.

The inner bearing pin 10 is placed through the bearing receptacle 7*a* in the center bracket 7 (step St1) before or after the left bracket (outer bracket) 5 of the first backrest part 3 is fastened to the vehicle chassis or seat part. The first backrest part 3 is thus pivotably accommodated on the two brackets 5, 7.

Figure 3:
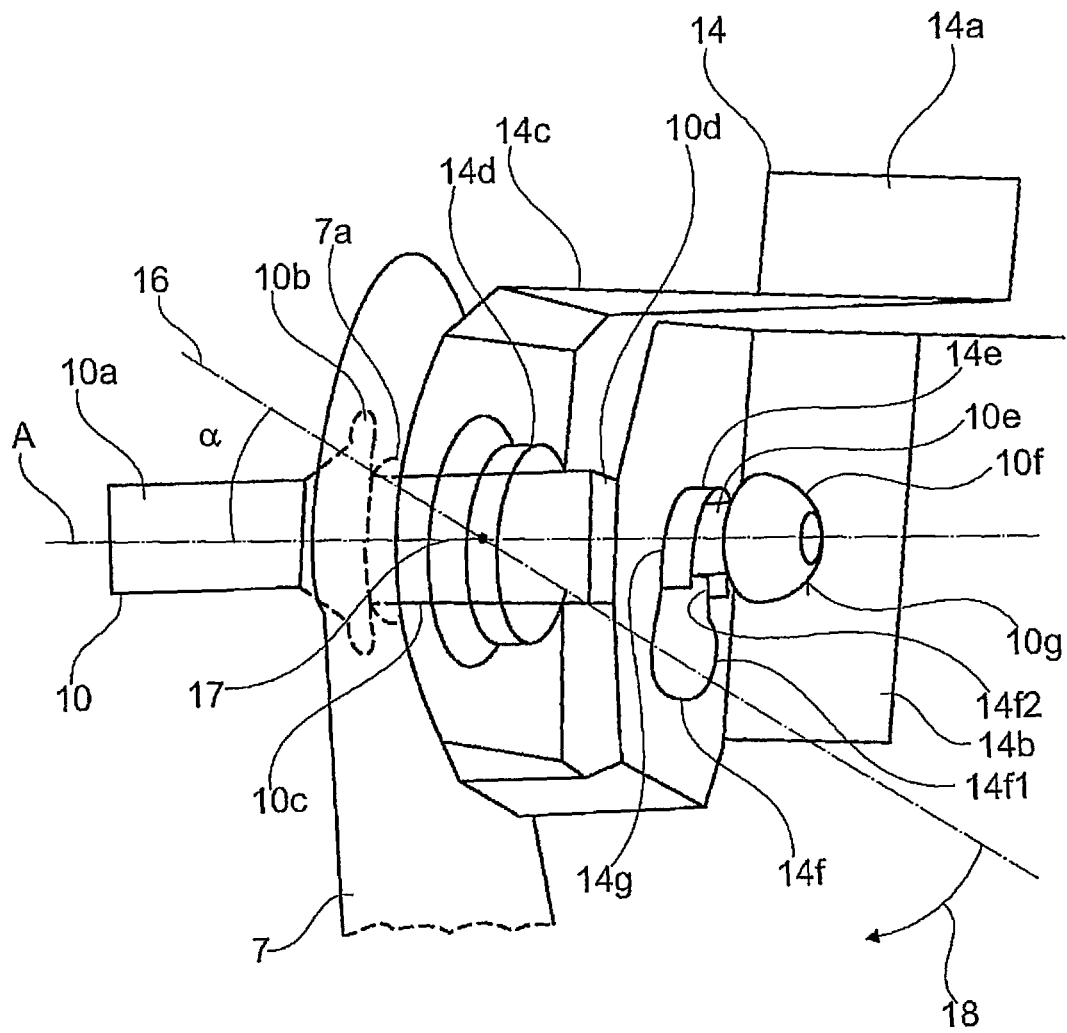
FIG. 3 shows a perspective view of the area of the connection of FIG. 2 according to the invention.
Figure 4:
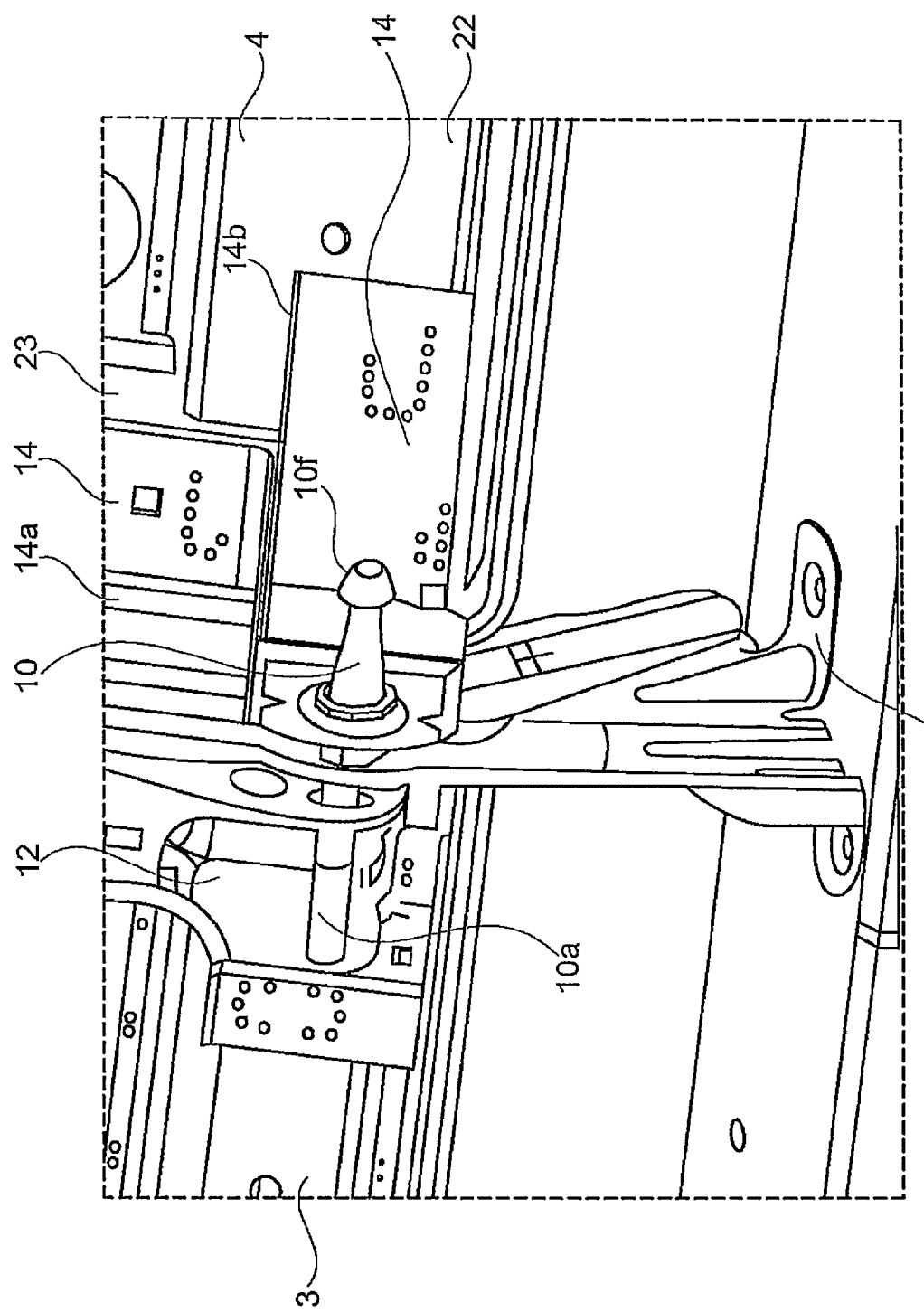
FIG. 4 shows another perspective view of the invention in greater detail.
Figure 5:
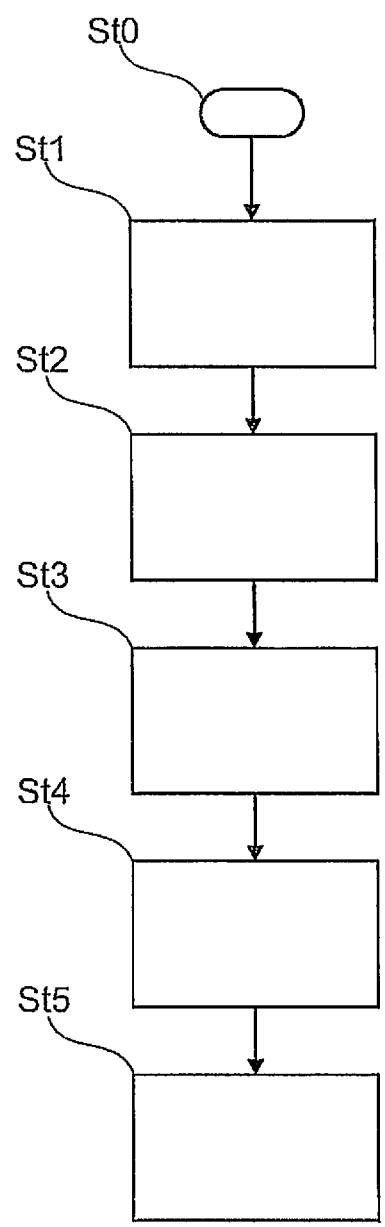
FIG. 5 shows a flow chart of steps of a manufacturing method according to the invention.

The second backrest part 4 having the fixedly mounted second mounting plate 14 is subsequently placed at an angle, i.e., diagonally, in step St2 in such a way that a mounting line 16, shown as a dotted line in FIG. 3, which extends at an angle α with respect to the bearing axis A and (approximately) through the first bearing pin receptacle 14*d* and the insertion area 14*f*1 of the mounting plate 14, is parallel to the bearing axis A or lies approximately on the bearing axis A, so that the protuberance of the first bearing pin receptacle 14*d* initially lies against the rounded surface 10*g* of the pin head 10*f* of the bearing pin 10.

In this position, in step St3 the second backrest part 4 is moved toward the middle, i.e., to the left in the front views and perspective front views, so that the mounting line 16 remains on the bearing axis A. In this preferably linear insertion operation, the pin head 10*f* thus passes through the insertion area 14*f*1 of the recess 14*f* in the mounting plate 14.

The second backrest part 4 together with its mounting plate 14 is subsequently pivoted by the angle α in step St4, as indicated by the arrow 18 in FIG. 3: the pivot motion proceeds with the outer (right) end of the second backrest part 4, i.e., in the area of its outer bracket 6, moving downwardly, the pivot motion occurring around the midpoint 17 of the first bearing pin receptacle 14*d*, so that the recess 14*d* with its upper positive-fit area 14*f*2 comes into contact with the neck area (second bearing area) 10*e* of the inner bearing pin 10.

The insertion operation is thus concluded as a result of this contact. The mounting of the second backrest part 4 thus requires only an angled placement, a linear insertion motion, and a subsequent pivot motion. Improper mounting is ruled out, since the pin head 10*f* can be inserted only into the lower insertion area 14*f*1 of the mounting plate 14.

The second backrest part 4 is subsequently fastened to the outer bracket 6 in step St5.

The vehicle seat backrest 2 configured in this way has a high degree of collision resistance. It is recognized that in typical collision situations there is a tendency for the backrest parts 2, 3 to come loose from the center bracket 7 and pivot upwardly and outwardly with their inner areas. However, this pivot motion merely results in contact of the neck area 10*e* of the bearing pin 10 against the contact surface 14*g* of the mounting plate 14.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

The invention claimed is:

1. Divided vehicle seat backrest, comprising:
   a) a first backrest part and a second backrest part generally defining a plane and for supporting forces that are applied perpendicular to the plane by a seat occupant under normal sitting conditions, the first and second backrest parts being rotatably supported on a center bracket via an inner bearing pin;
   b) the inner bearing pin being accommodated in a bearing recess in the center bracket and in a recess in the second backrest part; and
   c) the inner bearing pin being fastened to the first backrest part, and a positive fit being formed between the inner bearing pin and the second backrest part;
   d) the second backrest part having a first bearing pin receptacle for supporting a region of the inner bearing pin;
   e) a second bearing pin receptacle being situated at an axial distance from the first bearing pin receptacle for supporting a neck region of the inner bearing pin;
   f) each of the first and second bearing pin receptacles being holes, the second bearing pin receptacle including the recess in the second backrest part, the second bearing pin receptacle and the recess in the second backrest part forming a lobed receptacle with the recess being an insertion area that is wider than the second bearing pin receptacle and is located in a direction parallel to the plane defined by the second backrest part; and
   g) the second backrest part being fastened on the inner bearing pin, which extends through the bearing recess in the center bracket, and the inner bearing pin extends by a linear insertion motion through the first bearing pin receptacle in the second backrest part and by a subsequent pivot motion into the second bearing pin receptacle.

2. Divided vehicle seat backrest according to claim 1, wherein:
   a) the second backrest part is supported on the inner bearing pin without a supplementary securing element.

3. Divided vehicle seat backrest according to claim 2, wherein:
   a) the inner bearing pin is supported on the center bracket without a supplementary securing element.

4. Divided vehicle seat backrest according to claim 1, wherein:
   a) the inner bearing pin engages the second backrest part in a positive-fit manner.

5. Divided vehicle seat backrest according to claim 1, wherein:
   a) the inner bearing pin is fixedly fastened to the first backrest part.

6. Divided vehicle seat backrest according to claim 1, wherein:
   a) the second backrest part has a mounting part in which the second bearing pin receptacle is provided with the recess;
   b) the inner bearing pin has a bearing region for supporting in the center bracket, the neck region for supporting in the mounting part, and a pin head, which is widened with respect to the neck region, for engaging the mounting part in a positive-fit manner; and
   c) the recess having an insertion region having a larger diameter for inserting the pin head, and having a positive-fit region having a smaller diameter for supporting the neck region.

7. Divided vehicle seat backrest according to claim 6, wherein:
   a) the positive-fit region is adjacent to the insertion region.

8. Divided vehicle seat backrest according to claim 6, wherein:
   a) the insertion region is provided beneath the positive-fit region.

9. Divided vehicle seat backrest according to claim 6, wherein:
   a) the mounting part includes a folded mounting plate which is fastened to further structural parts of the second backrest part and which has two contact surfaces for fastening to further structural parts of the second backrest part, and has a bearing region between the contact surfaces for accommodating the inner bearing pin.

10. Divided vehicle seat backrest according to claim 6, wherein:
    a) the pin head has an axially outwardly pointing rounded surface for threading or inserting through the mounting part of the second backrest part.

11. Divided vehicle seat backrest according to claim 1, wherein:
    a) the first bearing pin receptacle has a rounded edge for inserting the pin head of the inner bearing pin.

12. Divided vehicle seat backrest according to claim 1, wherein:
    a) the inner bearing pin is supported on the center bracket without a supplementary securing element.

* * * * *